United States Patent
Hoag et al.

(10) Patent No.: US 11,168,605 B2
(45) Date of Patent: Nov. 9, 2021

(54) MANUFACTURE OF HEAT TRANSFER JACKETS

(71) Applicant: Southwest Research Institute, San Antonio, TX (US)

(72) Inventors: Kevin L. Hoag, San Antonio, TX (US); Christopher L. Wray, San Antonio, TX (US); Charles E. Roberts, Jr., Helotes, TX (US)

(73) Assignee: Southwest Research Institute, San Antonio, TX (US)

( * ) Notice: Subject to any disclaimer, the term of this patent is extended or adjusted under 35 U.S.C. 154(b) by 130 days.

(21) Appl. No.: 16/600,392

(22) Filed: Oct. 11, 2019

(65) Prior Publication Data
US 2021/0108552 A1 Apr. 15, 2021

(51) Int. Cl.
| | |
|---|---|
| *F02F 1/10* | (2006.01) |
| *F01P 3/02* | (2006.01) |
| *F28F 13/08* | (2006.01) |
| *F28F 13/12* | (2006.01) |
| *B33Y 80/00* | (2015.01) |

(52) U.S. Cl.
CPC ............. *F01P 3/02* (2013.01); *F28F 13/08* (2013.01); *F28F 13/12* (2013.01); *B33Y 80/00* (2014.12); *F01P 2003/024* (2013.01)

(58) Field of Classification Search
CPC .......... F01P 3/02; F01P 2003/024; F02F 1/14; F02F 1/40; B33Y 80/00; B33Y 10/00
USPC ....................................................... 123/41.72
See application file for complete search history.

(56) References Cited

U.S. PATENT DOCUMENTS

| | | | | |
|---|---|---|---|---|
| 4,768,484 A | * | 9/1988 | Scarselletta | F01P 3/22 |
| | | | | 123/41.21 |
| 9,506,390 B1 | * | 11/2016 | Hendrickson | F01N 3/0842 |
| 2015/0285125 A1 | * | 10/2015 | Hayman | F01P 3/02 |
| | | | | 123/41.72 |
| 2017/0268405 A1 | * | 9/2017 | Yi | F01P 7/14 |
| 2018/0135504 A1 | * | 5/2018 | Quix | F01P 3/02 |
| 2019/0162490 A1 | * | 5/2019 | Heusser | B01F 15/066 |
| 2019/0170086 A1 | * | 6/2019 | Coppola | F02F 1/14 |

\* cited by examiner

*Primary Examiner* — Long T Tran
*Assistant Examiner* — James J Kim
(74) *Attorney, Agent, or Firm* — Livingston Law Firm (57) ABSTRACT

Heat transfer jackets with various passage configurations for cooling or heating equipment. For the equipment of interest, one or more regions of maximum heat transfer are identified. For these regions, the cooling jacket is configured with at least one of the following heat transfer passage geometries: impinging jets, curved blades, columns, dimpled interface, organic, or turbulator. The passage geometries are then manufactured using additive manufacturing.

10 Claims, 11 Drawing Sheets

MANUFACTURE OF HEAT TRANSFER JACKETS

TECHNICAL FIELD OF THE INVENTION

This invention relates to heat transfer devices, and more particularly to passage geometries for heat transfer jackets.

BACKGROUND OF THE INVENTION

Cooling jackets (also called water jackets) are used for cooling of various types of heat-generating equipment. For example, in a reciprocating piston internal combustion engine, the cooling jacket has passages that are conventionally cast or bored through the cylinder block and head. These passages carry a coolant liquid and are connected by inlet and outlet valves to a radiator. The cooling jacket and radiator provide heat transfer from the engine.

In general, a cooling jacket is a liquid-filled casing having passages to allow coolant (or other fluid) to be pumped through and circulated. The term "jacket" implies a casing external to the heat-generating equipment. The cooling jacket permits the exchange of heat between the heat-generating equipment and the fluid circulating in the cooling jacket.

The same concepts apply to jackets used to warm a piece of equipment or other object. In this case, the fluid entering the jacket and flowing through passages in the jacket would be used to add heat rather than to remove it. Thus, in general, a "heat transfer jacket" can be used for either cooling or heating.

In the case of an internal combustion engine, temperature control in the materials surrounding the combustion chamber is critical. Although heat loss can be detrimental to maximum efficiency, practical material considerations require cooling so that peak metal temperatures are not exceeded. Different regions of the engine have different heat transfer needs. High flow rates and locally high velocity in critical regions have been the method of choice. However, the resulting metal temperature maps are not ideal, and the pumping power requirements are higher than desired.

BRIEF DESCRIPTION OF THE DRAWINGS

A more complete understanding of the present embodiments and advantages thereof may be acquired by referring to the following description taken in conjunction with the accompanying drawings, in which like reference numbers indicate like features, and wherein.

DETAILED DESCRIPTION OF THE INVENTION

The following description is directed to the design and manufacture of heat transfer jackets. For purposes of this description, a "heat transfer jacket" is an outer sheath around a piece of equipment, having passages through which a liquid (water or other liquid) is circulated. The liquid provides a heat transfer for the purposes of preventing overheating (or providing warming) of the equipment.

As indicated in the Background, a common use of a heat transfer jacket is for cooling an internal combustion engine. For that application, the jacket is referred to as a "cooling jacket". However, there may also be applications in which a liquid is used to warm a piece of equipment, rather than to cool it. In both cases, the goal is heat transfer via a liquid flowing through passages in the jacket.

For purposes of example herein, the equipment for which the heat transfer jacket is used is a cylinder head of an internal combustion engine. The engine is heat-generating; thus, the heat transfer jacket may also be referred to as a cooling jacket. However, the same concepts apply to heat transfer jackets for many other various types of equipment.

Figure 1:
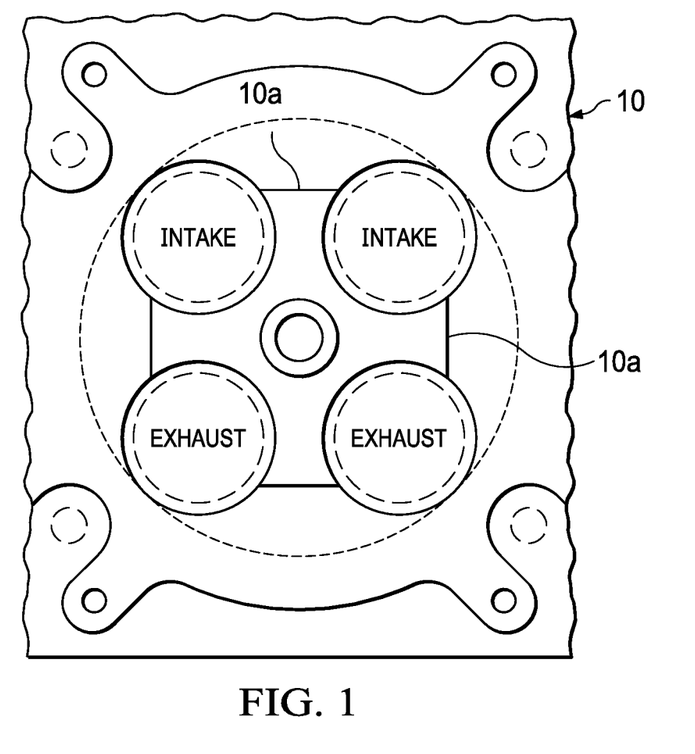
FIG. 1 is a top plan view of a portion of a cylinder head of an internal combustion engine.

FIG. 1 illustrates a portion of a cylinder head 10 in top plan view. Intake and exhaust ports of the cylinder are indicated, as well as the diameter of the combustion chamber.

As explained below and although not explicitly shown in FIG. 1, the cylinder head is a cooling jacket in the sense that it has passages for carrying a liquid coolant. As in all cylinder heads, these passages carry the engine's coolant—usually a mixture of water and antifreeze—to transfer excess heat away from the engine.

The method of the invention is directed to designing and manufacturing passages for heat transfer jackets. A feature of the method is the recognition that heat transfer design can be localized so that heat transfer occurs only where needed and to the extent needed. Unique and specific heat transfer enhancement passages are placed in local regions requiring the most effective heat transfer. Furthermore, the method minimizes or eliminates wasteful supplying of coolant or other heat transfer liquid in regions where it is less needed or not needed at all.

For the cylinder head of FIG. 1, the method improves temperature control within the cylinder head, while minimizing overall flow restriction and required coolant pumping power. For example, the region 10a of FIG. 1 between the valve ports is a region critical to cylinder head cooling. Other regions can be identified where the same or different levels of cooling are required. An entire cylinder head can be mapped with different levels of cooling (or no cooling) desired for different regions of the cylinder head.

Figure 2:
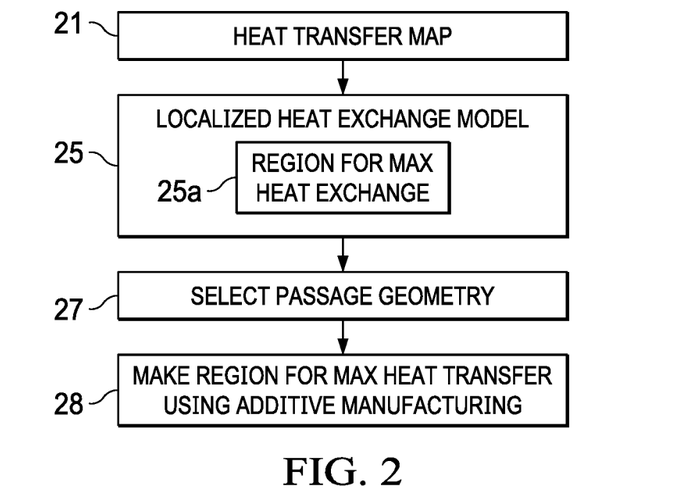
FIG. 2 illustrates a method of designing and manufacturing heat transfer jackets.

FIG. 2 illustrates a method of designing and manufacturing a heat transfer jacket. For a given piece of equipment, a three-dimensional heat transfer map 21 represents how that equipment generates heat when in operation. Data representing temperature fields and heat fluxes can be generated throughout a piece of equipment or component of interest. For the cylinder head example of this description, computer simulations and modeling can be used to identify regions in the cylinder head that require the most cooling and more generally, the amount of cooling (if any) desirable for any region within the cylinder head.

For the equipment of interest, regions with different levels of heat transfer requirements are identified. These equipment regions correspond to regions of the heat transfer jacket that will be placed against these equipment regions for heat transfer.

As stated above, for a cooling jacket, the desired heat transfer may be determined by more than one factor. In some regions, protecting metal parts may be an overriding factor. In other regions, maximizing engine efficiency may be paramount and more heat may be tolerated.

The result is a model or other identification of different regions of a heat transfer jacket with localized heat transfer requirements. The heat transfer jacket is assumed to have at least one region 25a where maximum heat transfer is desired. The heat transfer jacket may also have additional regions with different levels of desired heat transfer or where no heat transfer is needed.

FIGS. 3A-8 illustrate various heat transfer passage geometries suitable for localized heat transfer, particularly where maximum heat transfer is desired. When used in a heat transfer jacket, each of these passage geometries provides enhanced heat transfer where needed for the equipment of interest. In the examples of FIGS. 3A-8, the various passage geometries are incorporated into a simple rectangular heat transfer region, but the heat transfer region can have a myriad of other shapes.

For the equipment of interest, one or more of the passage configurations of FIGS. 3A-8 is used to heat or cool the region for maximum heat transfer. Because of the localized feature of the overall design, it is ensured that these enhanced passage geometries are used only where necessary to maximize heat transfer. Passages providing less heat transfer, or less concentrated versions of the maximum heat transfer passages, can be used in other areas as appropriate for a desired amount of heat transfer.

Figure 3A:
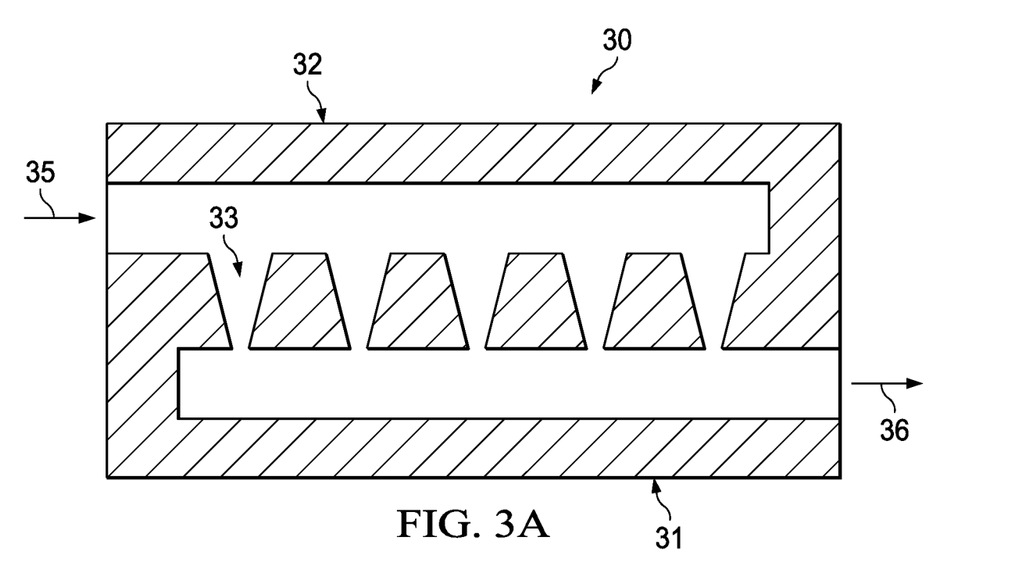
FIGS. 3A and 3B illustrate impinging jet passages for use in a heat transfer jacket.
Figure 3B:
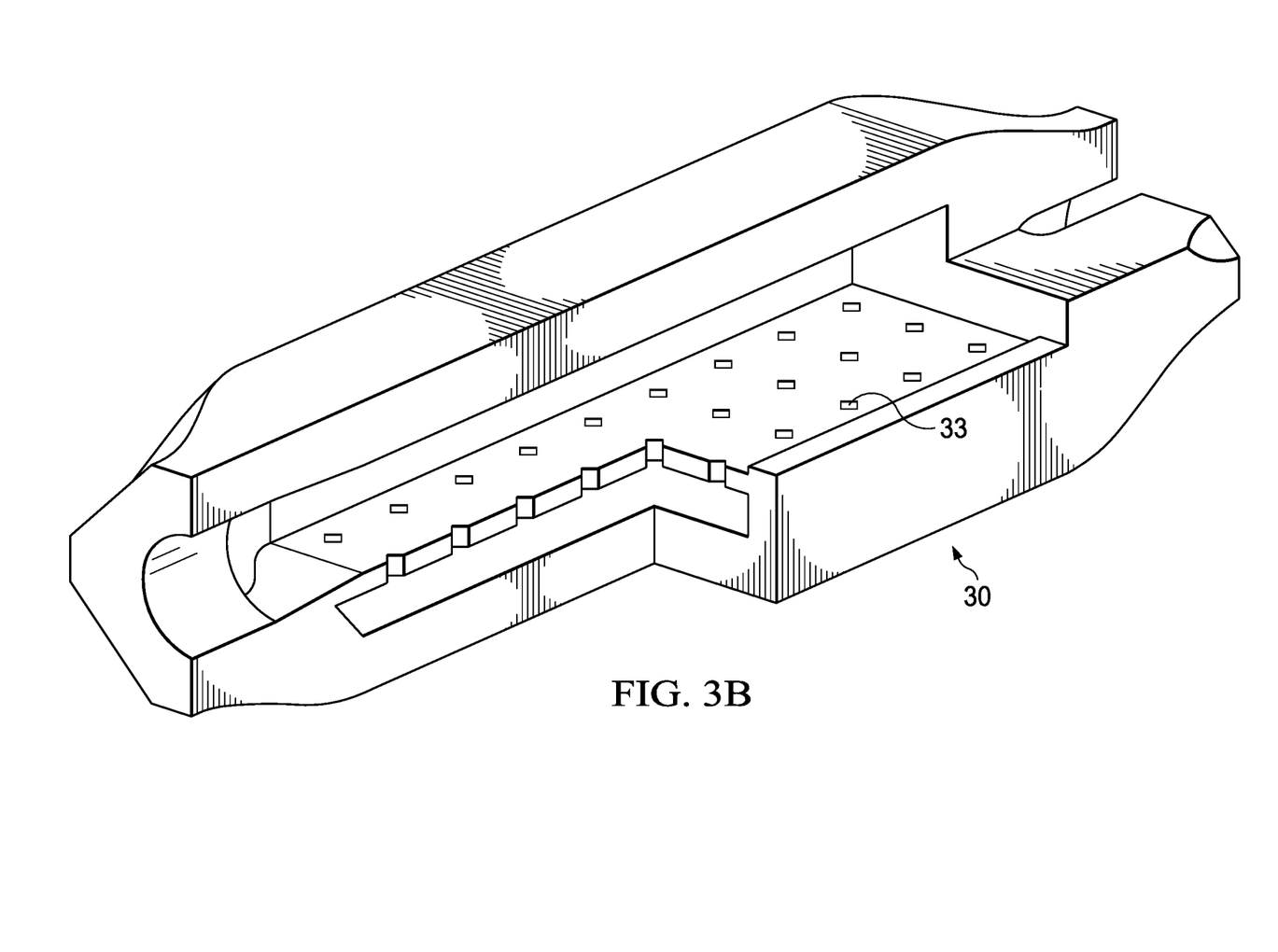

FIGS. 3A and 3B illustrate "impinging jet" passages 33 within a portion 30 of a heat transfer jacket. The portion 30 of the cooling jacket is assumed to be a part used to cool or heat a surface 31 of the equipment where maximum heat transfer is desired. Thus, surface 31 corresponds to region 25a of FIG. 2. In a cylinder head, surface 31 corresponds to region 10a of FIG. 1.

The impinging jet passages 33 are formed within the cooling jacket 30 between an outer surface 32 of the cooling jacket and the surface 31 to be cooled or heated. A number of impinging jet passages 33 are spaced between, and are in fluid communication with, both an inlet passage 35 and an outlet passage 36. The inlet passage 35 runs generally parallel to the outside surface 32 of the cooling jacket, whereas the outlet passage 36 runs generally parallel to the equipment surface 31.

Coolant (or other heat transfer fluid) enters passage 35, flows toward surface 31n via passages 33, and exits via passage 36. The impinging passages 33 become narrower as they approach passage 36 and surface 31, thereby effectively forming nozzles directed at surface 31.

Figure 4A:
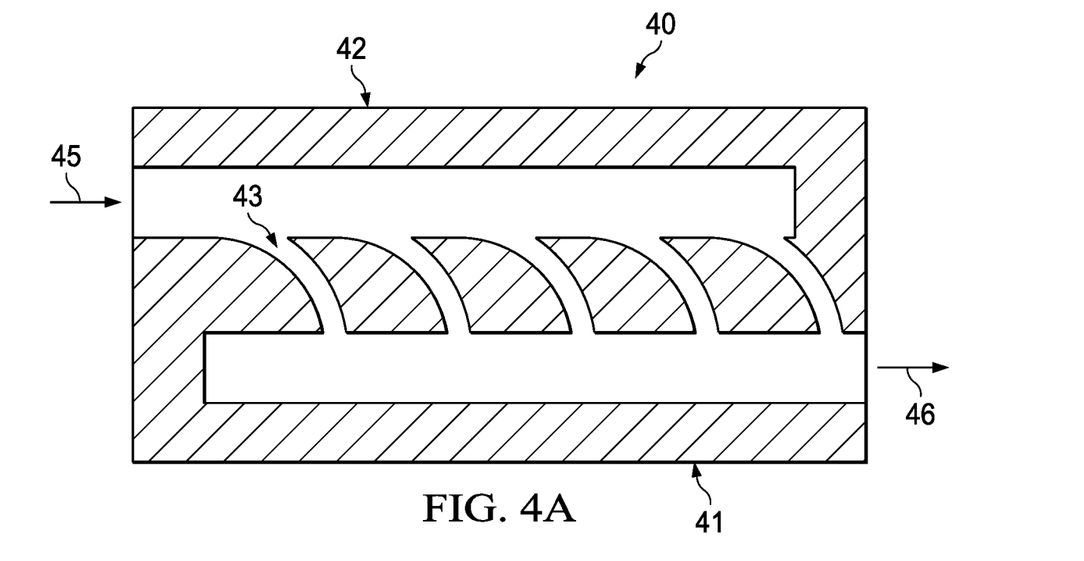
FIGS. 4A-4C illustrate curved flow passages for use in a heat transfer jacket.
Figure 4B:
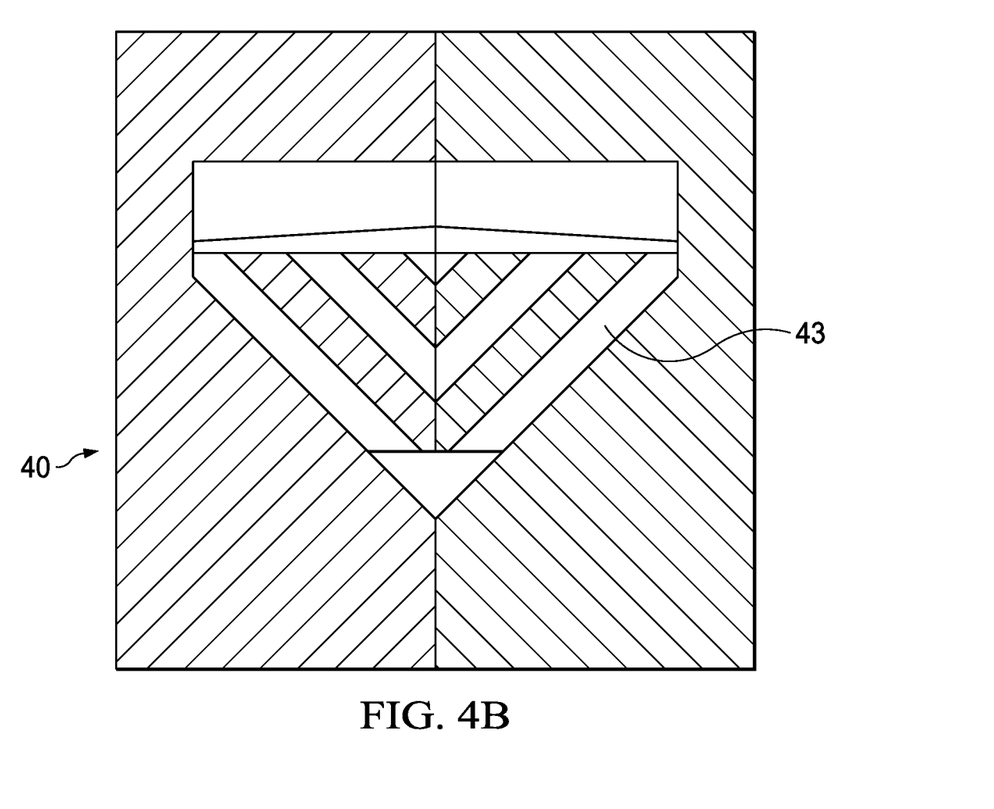
Figure 4C:
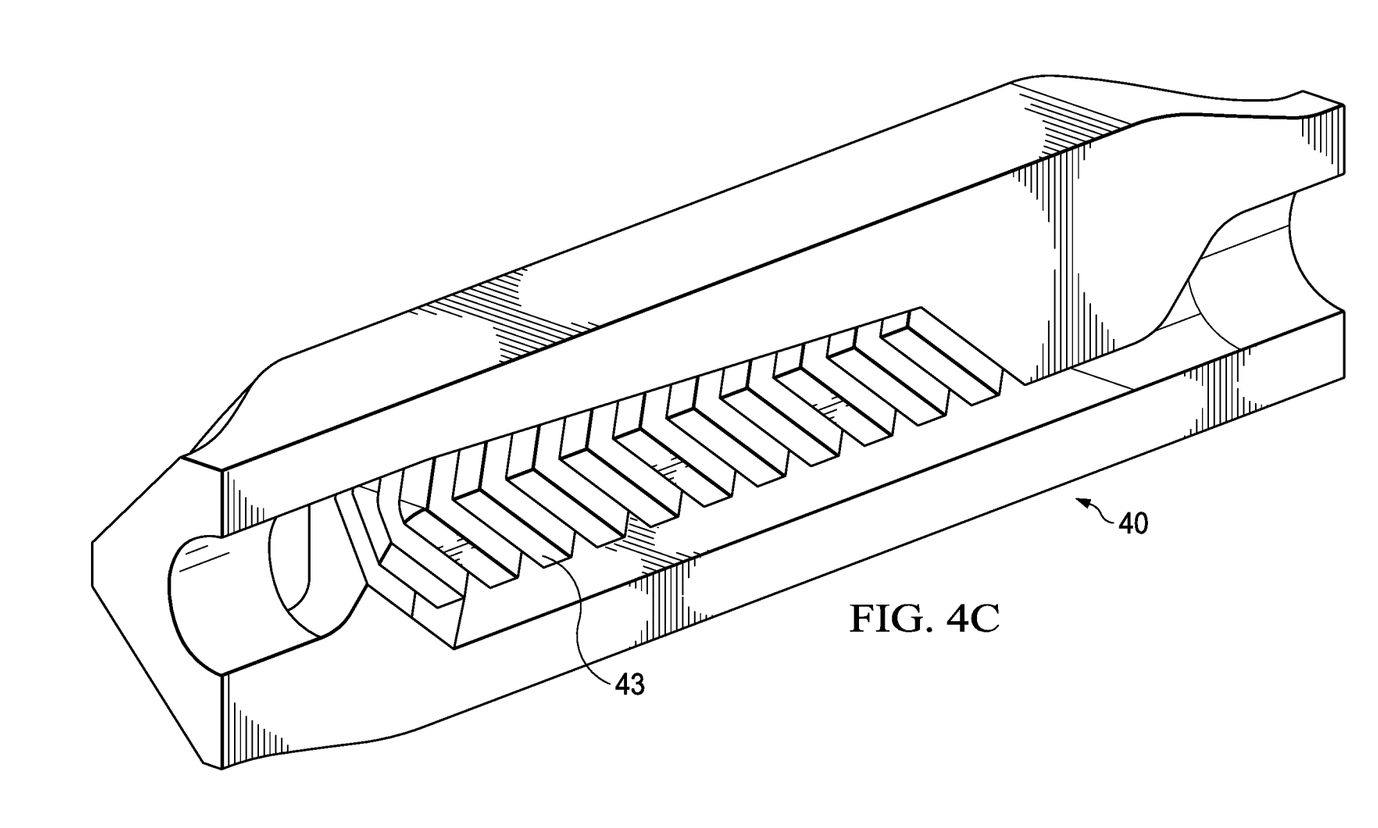

FIGS. 4A-4C illustrate curved flow passages 43 within a portion 40 of a heat transfer jacket. Like FIG. 3, this portion 40 is desired to have maximum heat transfer where it is used with the equipment of interest.

The curved flow passages 43 are formed within the cooling jacket 40 between an outer surface 42 of the cooling jacket and the surface 31 to be cooled or heated. A number of curved flow passages 43 are spaced between, and are in fluid communication with, both an inlet passage 45 and an outlet passage 46. Coolant (or other heat transfer fluid) enters passage 45, flows toward surface 41 via curved flow passages 43, and exits via passage 46.

Figure 5A:
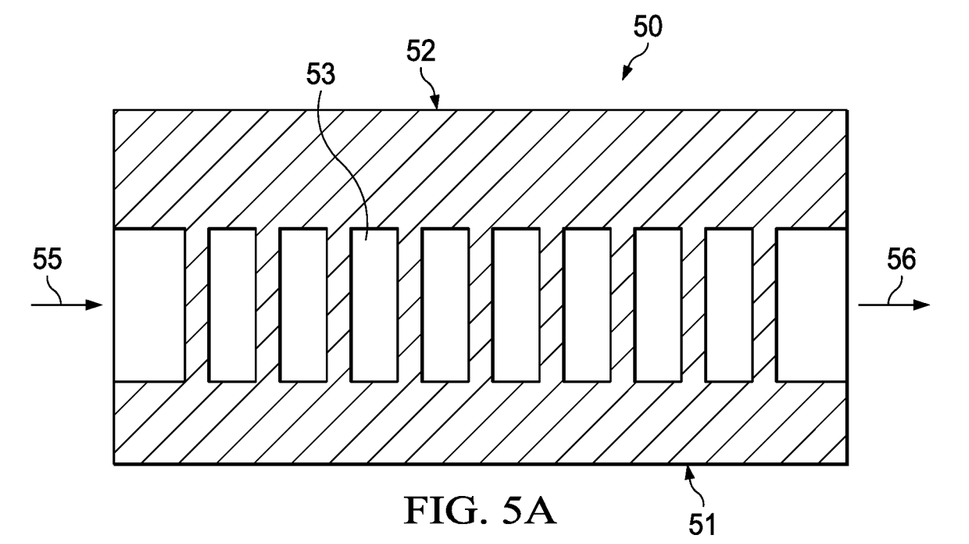
FIGS. 5A and 5B illustrate column passages for use in a heat transfer jacket.
Figure 5B:
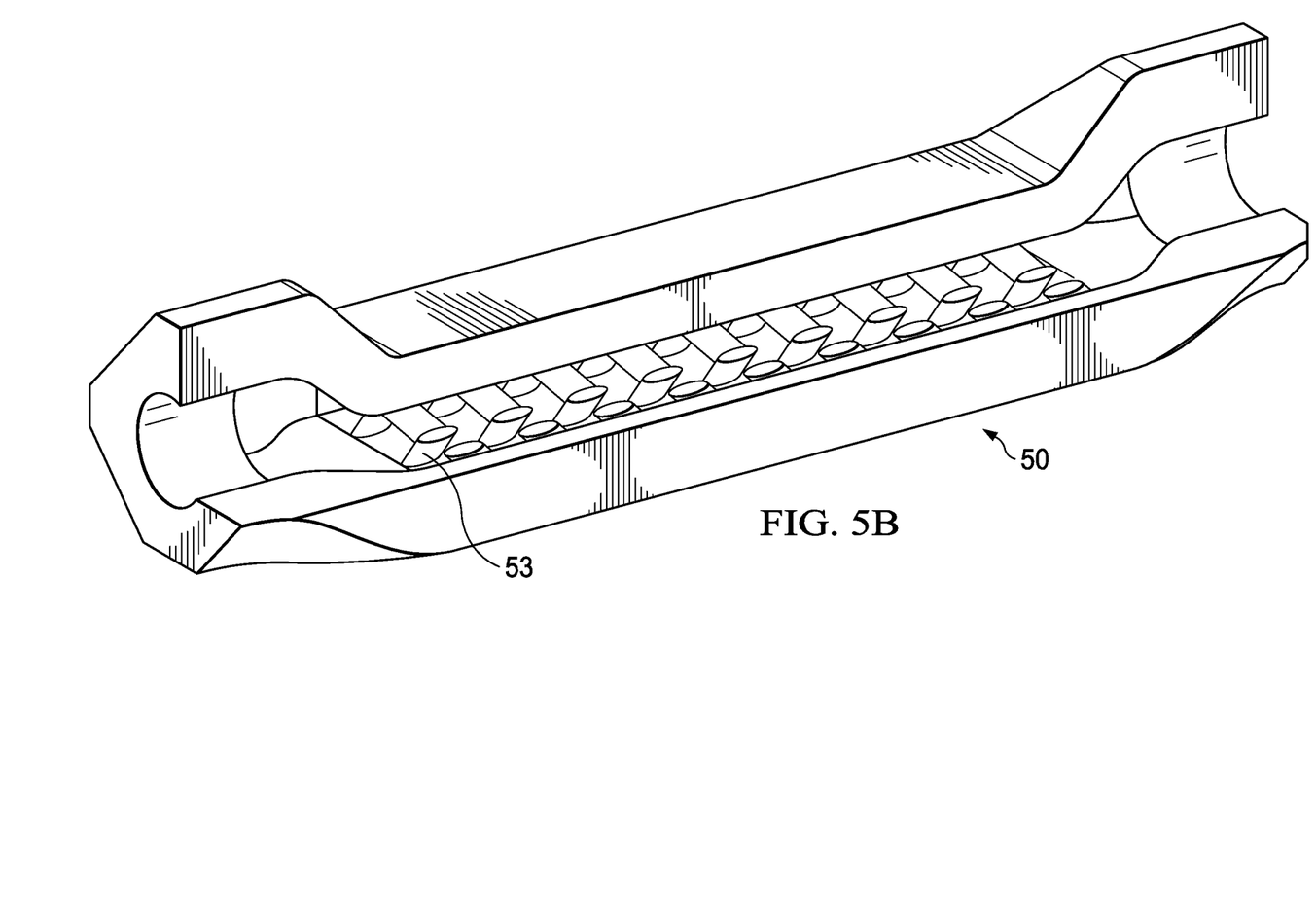

FIGS. 5A and 5B illustrate column passages 53 within a portion 50 of a heat transfer jacket. The column passages 53 are formed within the cooling jacket 50 between an outer surface 52 of the cooling jacket and the surface 51 to be cooled or heated. A number of column passages 53 are spaced between, and are in fluid communication with, both an inlet passage 55 and an outlet passage 56. Coolant (or other heat transfer fluid) enters passage 55, flows toward surface 51 via passages 53, and exits via passage 56.

Figure 6A:
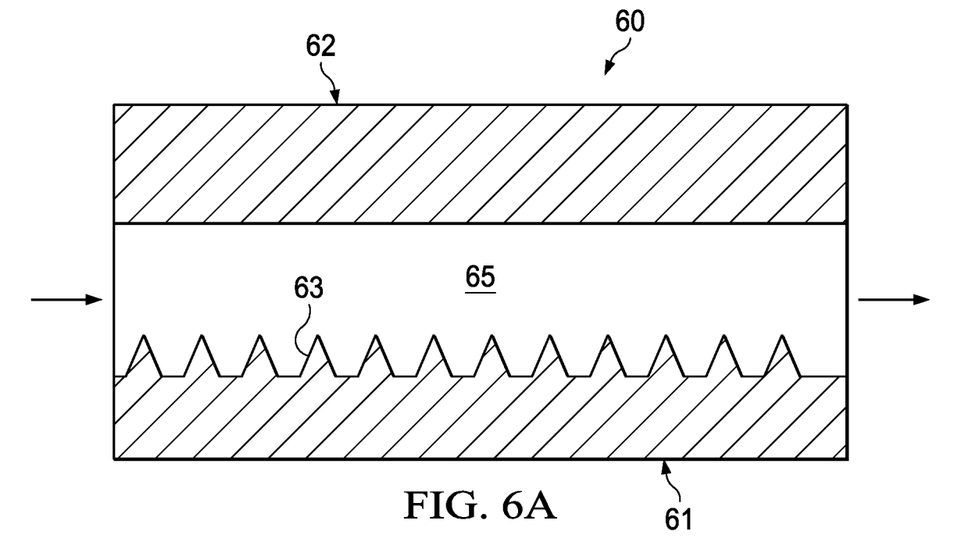
FIGS. 6A and 6B illustrate a dimpled interface passage for use in a heat transfer jacket.
Figure 6B:
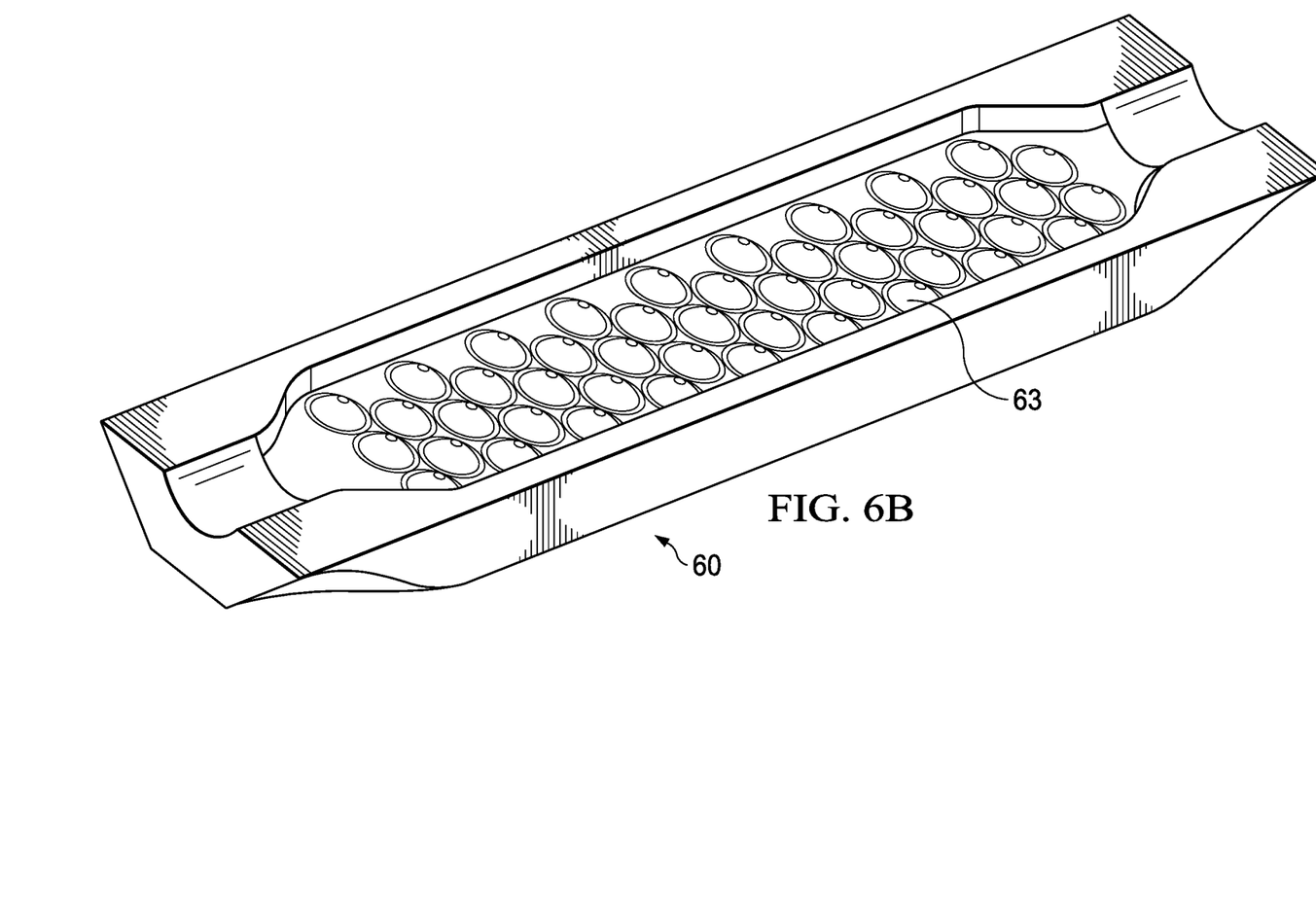

FIGS. 6A and 6B illustrate a passage having a dimpled interface 63 within a portion 60 of a heat transfer jacket. The dimpled interface 63 is formed within the cooling jacket 50 between an outer surface 62 of the cooling jacket and the surface 61 to be cooled or heated. Coolant (or other heat transfer fluid) enters an inlet side of a horizontal passage 65 which has the dimpled interface 63 against surface 61. As the fluid flows through passage 65, the dimpled interface 63 generates turbulence of the fluid, thereby enhancing heat transfer.

Figure 7:
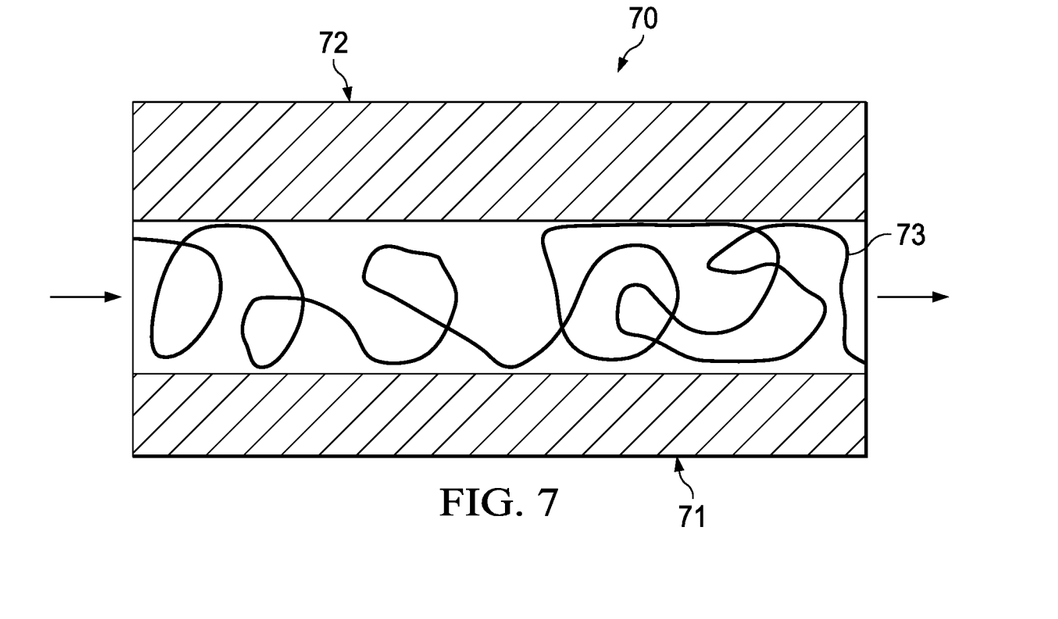
FIG. 7 illustrates organic passages for use in a heat transfer jacket.

FIG. 7 illustrates an "organic" passage 73 within a portion 70 of a heat transfer jacket. The organic passage 73 is formed within the cooling jacket 70 between an outer surface 72 of the cooling jacket and the surface 71 to be cooled or heated. Coolant (or other heat transfer fluid) enters an inlet side of the random passage, flows through the organic passage, and out an outside side. As the fluid flows through passage 73, heat transfer occurs through turbulence generation and high surface area. The path of passage 73, although seemingly random, is optimized for heat transfer, structural integrity and weight reduction.

Figure 8:
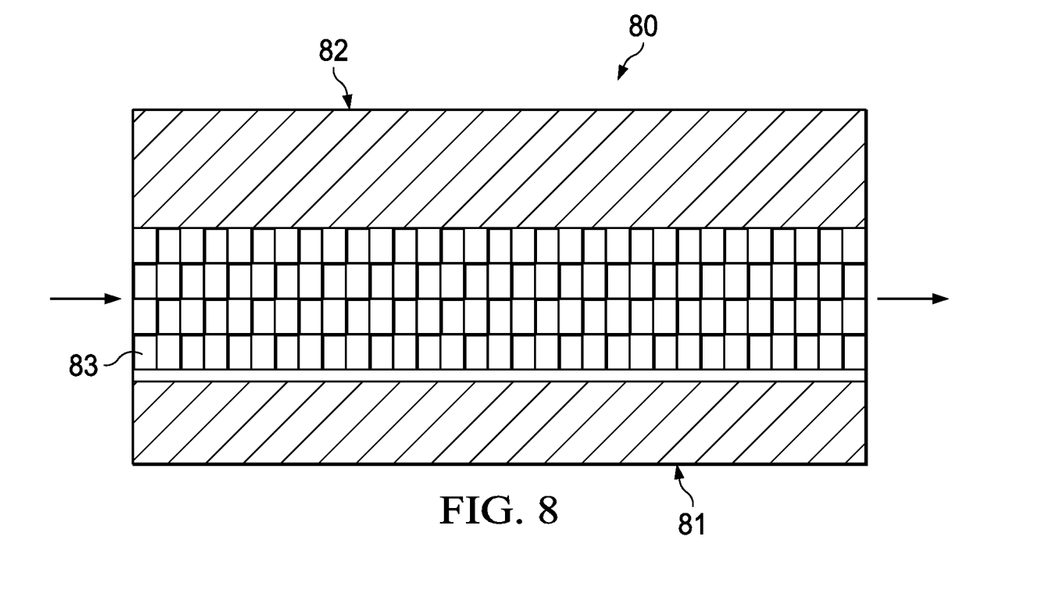
FIG. 8 illustrates turbulator passages for use in a heat transfer jacket.

FIG. 8 illustrates turbulator passages 83 within a portion 80 of the cooling jacket. The turbulator passages 83 are formed within the cooling jacket 80 between an outer surface 82 of the cooling jacket and the surface 81 to be cooled or heated. Coolant (or other heat transfer fluid) enters an inlet side of the turbulator passages 83, flows through the turbulator passages, and out an outlet side. As the fluid flows through passages 83, heat transfer occurs through turbulence generation and high surface area. The path of passage 73 is similar to that of baffles used in conventional heat transfer.

Referring again to FIG. 2, Step 28 is manufacturing the region for maximum heat transfer, using additive manufacturing. Each of the passage designs of FIGS. 3A-8 may be manufactured using additive manufacturing. The particular additive manufacturing material and process may vary depending on the application. Additive manufacturing allows complex and small geometries not possible with conventional casting.

In some cases, a portion of a larger heat exchange jacket, the portion having one of the above-described passage geometries, may be made using additive manufacturing. Next, conventional casting methods may be used to cast the remainder of the cooling jacket around the additive manufactured portion. These conventional casting methods might be sand casting or using salt cores with aluminum. For example, if the additive manufactured portion were made of a higher melting point material, that portion could be made first. It would then be held in place with sand/salt cores while pouring in the rest of the cooling jacket around it.

Referring again to Step 25 of FIG. 2, the localized heat transfer model can use various heat transfer metrics to quantify a desired heat transfer for various regions of the equipment. The result is the localized heat transfer model 25, with varying heat transfer requirement for different regions of the equipment. As stated above, some regions may require maximum heat transfer, using the geometries of FIGS. 3A-8, and other regions may require less complex or effective geometries.

Figure 9:
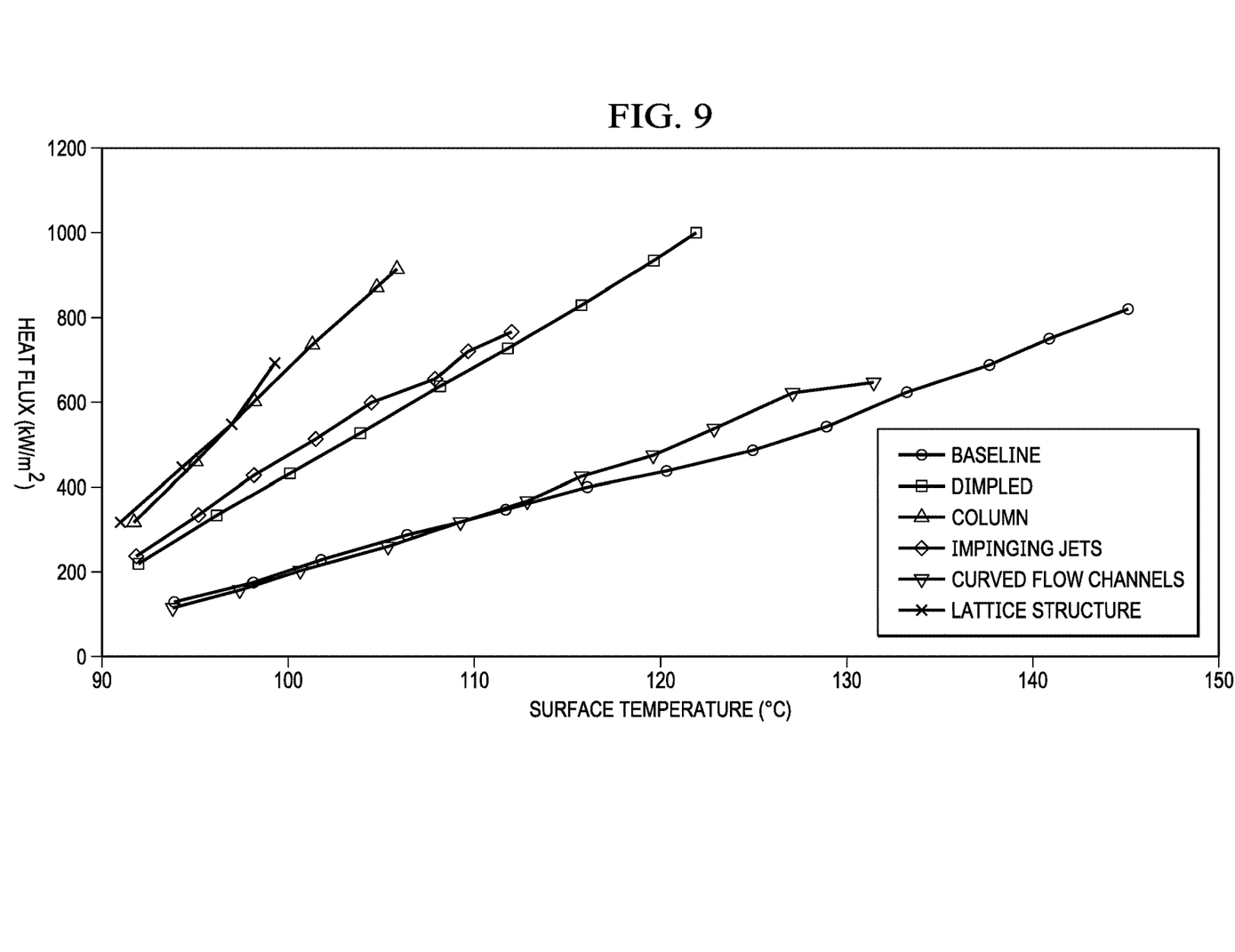
FIG. 9 illustrates how passage geometries may be tested for heat flux.

FIG. 9 illustrates how various heat transfer geometries may be tested for heat flux. Each geometry is produced as a test specimen. It is then placed in a test system, equipped to provide a coolant flow through the specimen, to heat the specimen, and to measure inlet and outlet pressure and temperature. As indicated, each geometry has unique heat flux characteristics, which vary depending on the temperature to which it is heated. This information can be compared to a desired heat transfer of the equipment of interest, for use in selecting an optimum heat transfer geometry.

In the example of FIG. 9, the flow rate of the coolant fluid was 0.6 kg/s with a pressure of 1.5 bar. The demands of the equipment of interest can be simulated with different flow rates and pressures.

Figure 10:
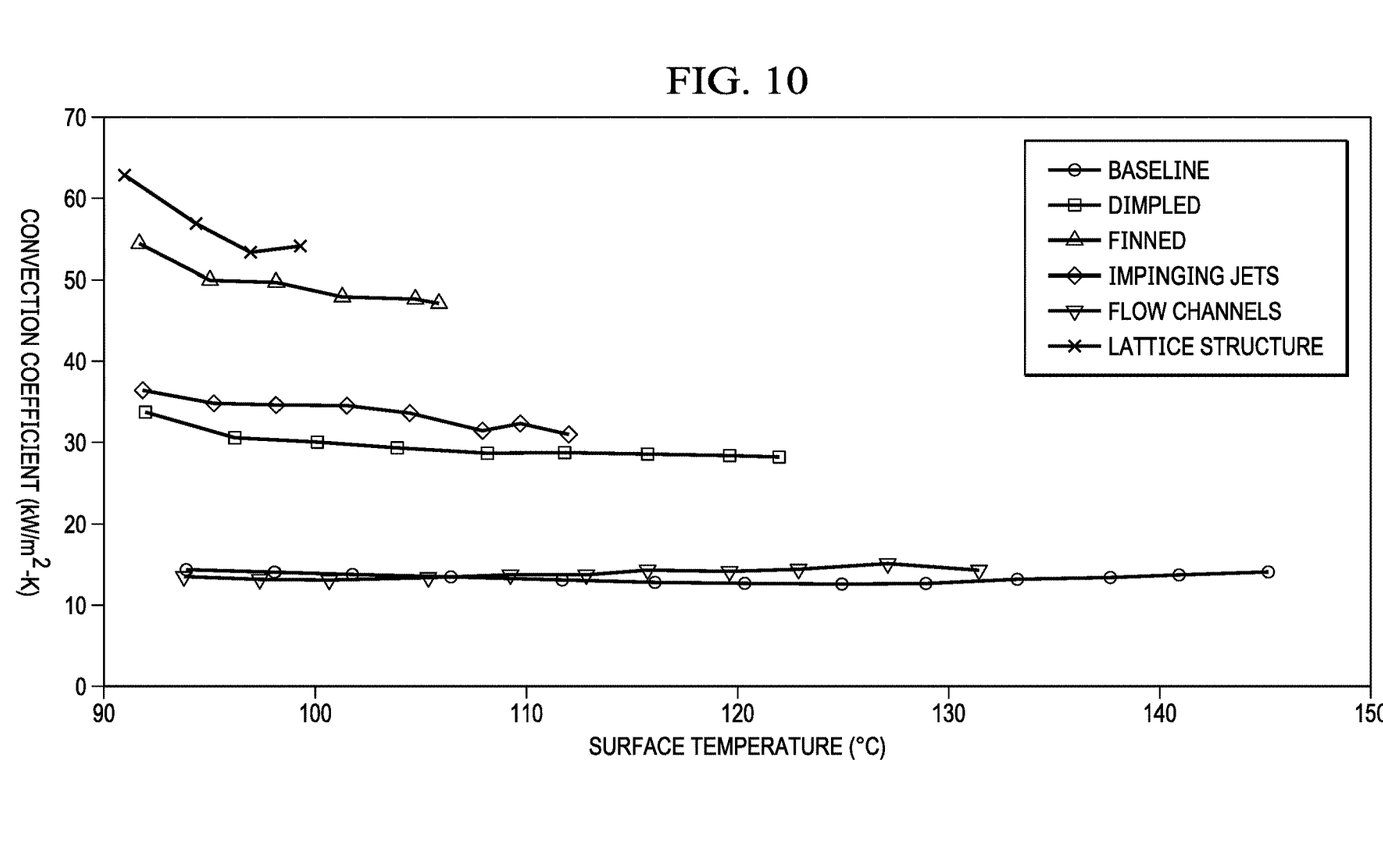
FIG. 10 illustrates how passage geometries may be tested for their convection coefficient.

FIG. 10 illustrates how various heat transfer geometries can be tested for their convection coefficient. The testing is performed as described above, with calculations performed to determine a convection coefficient at varying pressures and flow rates.

What is claimed is:

1. A method of providing a heat transfer jacket for an equipment of interest, comprising:
    generating a model of the equipment, with the model operable to map different regions of the equipment having different heat transfer requirements and to quantify the heat transfer requirements of the different regions; wherein at least one of the different regions of the equipment is a region expected to require a maximum heat transfer during operation of the equipment, as compared to other of the different regions of the equipment;
    mapping regions of the heat transfer jacket corresponding to the regions of the equipment, the regions of the heat transfer jacket operable to provide differing levels of heat transfer to or from the equipment of interest;
    testing a number of heat transfer passage geometries with liquid flow, using the same flow rate and the same flow pressure as is used for the equipment, the testing being performed by using different temperatures of the liquid flow and determining the heat flux at each ternperature;
    selecting a passage geometry based on the testing step; and
    using additive manufacturing to produce at least a portion of the heat transfer jacket such that the region expected to require a maximum heat transfer during operation of the equipment, is cooled or heated with the selected heat transfer passage geometry.

2. The method of claim 1, wherein the equipment of interest is a cylinder head or cylinder block.

3. The method of claim 2, wherein the region expected to require a maximum heat transfer during operation of the equipment, is a region between cylinder valve ports.

4. The method of claim 1, further comprising casting additional regions of a heat transfer jacket around the at least one region of maximum heat transfer.

5. A heat transfer jacket for heating or cooling equipment, comprising:
    an outer surface and an inner surface having a solid filler material between them;
    wherein the filler material has a number of passages for conducting a heat transfer liquid through the heat transfer jacket;
    wherein the geometry of at least some the passages is configured using the following process: generating a model of the equipment, with the model operable to map different regions of the equipment with different heat transfer requirements and to quantify the heat transfer requirements of the different regions; wherein at least one of the different regions of the equipment is a region expected to require a maximum heat transfer during operation of the equipment as compared to other of the different regions of the equipment mapping regions of the heat transfer jacket corresponding to the regions of the equipment, the regions of the heat transfer jacket operable to provide differing levels of heat transfer to or from the equipment of interest; testing a number of heat transfer passage geometries with liquid flow, using the same flow rate and the same flow pressure as is used for the equipment, the testing being performed by using different temperatures of the liquid flow and determining the heat flux at each temperature:
    and selecting a passage geometry based on the testing step.

6. The heat transfer jacket of claim 5, wherein the equipment is a cylinder head or cylinder block.

7. The heat transfer jacket of claim 5 wherein the region expected to require a maximum heat transfer during operation of the equipment is a region between cylinder valve ports.

8. The heat transfer jacket of claim 5, further comprising additional regions of the heat transfer jacket cast around the at least one region of maximum heat transfer.

9. An improved cylinder head or cylinder block for an internal combustion engine, the improvement comprising:
    a heat transfer jacket having passages wherein the geometry of at least some the passages is configured using the following process: generating a model of the equipment. with the model operable to map different regions of the equipment with different heat transfer requirements and to quantif the heat transfer requirements of the different regions; wherein at least one of the different regions of the equipment is a region expected to require a maximum heat transfer during operation of the equipment, as compared to other of the different regions of the equipment; mapping regions of the heat transfer jacket corresponding to the regions of the equipment, the regions of the heat transfer jacket operable to provide differing levels of heat transfer to or from the equipment of interest; testing a number of heat transfer passage geometries with liquid flow, using the same flow rate and the same flow pressure as is used for the equipment, the testing being performed by using different temperatures of the liquid flow and determining the heat flux at each temperature; and selecting a passage geometry based on the testing step.

10. The improved cylinder head or cylinder block of claim 9, wherein the region expected to require a maximum heat transfer during operation of the equipment is a region between cylinder valve ports.

* * * * *